Easterday & Crowell,
Grain Drill.
No. 92,945. Patented July 27, 1869.
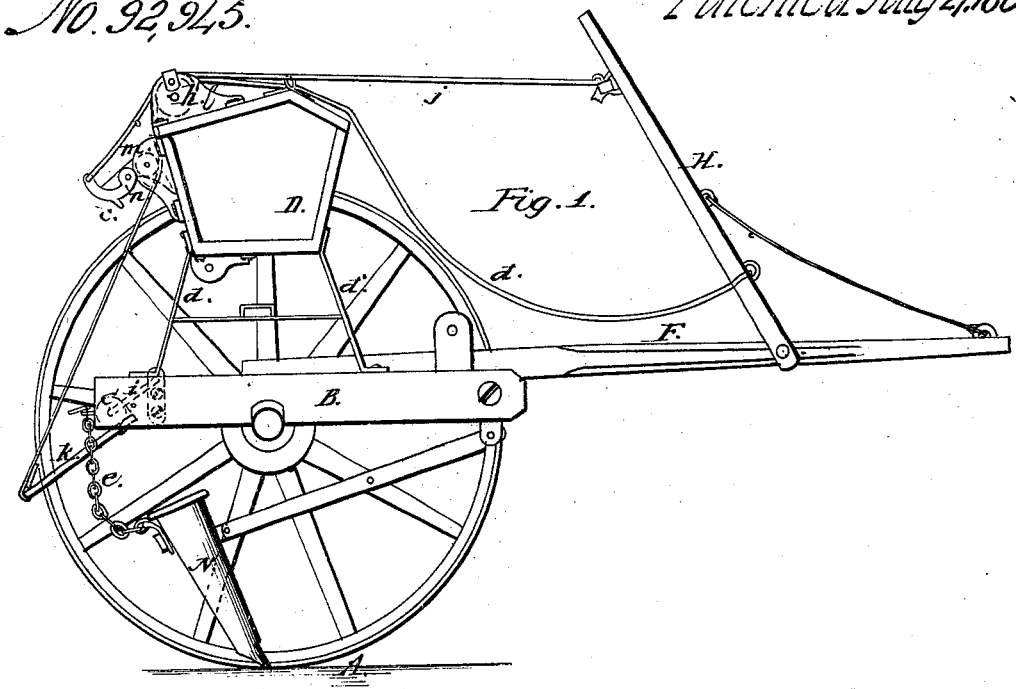
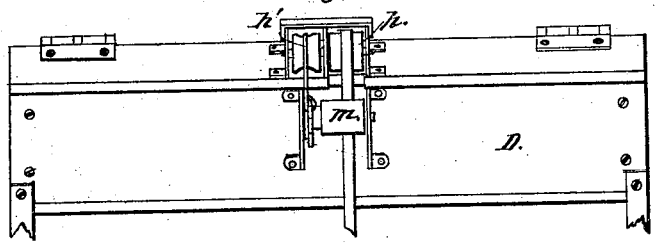
Witnesses:
H. N. Miller
Jus. P. White
Inventor;
J. Easterday & J. B. Crowell
per J. W. Alexander, Atty

United States Patent Office.

JOSEPHUS EASTERDAY, OF FREDERICK COUNTY, MARYLAND, AND J. B. CROWELL, OF GREENCASTLE, PENNSYLVANIA.

Letters Patent No. 92,945, dated July 27, 1869.

---

IMPROVEMENT IN GRAIN-DRILLS.

---

The Schedule referred to in these Letters Patent and making part of the same.

---

*To all whom it may concern:*

Be it known that we, JOSEPHUS EASTERDAY, of Frederick county, Maryland, and J. B. CROWELL, of Greencastle, in the county of Franklin, and State of Pennsylvania, have invented certain new and useful Improvements in Devices for Elevating Seed-Spouts; and we do hereby declare that the following is a full, clear, and exact description thereof, reference being had to the accompanying drawings, and to the letters of reference marked thereon, which form a part of this specification, in which—

Figure 1 represents a side elevation of our machine.

Figure 2 is a plan view of seed-box.

The nature of our invention consists in the construction of certain devices for elevating and lowering the bar to which the seed-spouts are attached, and also in the mode of operating said bar and seed-spouts.

A represents the wheels;

B, the frame; and

D, the seed-box, as seen in side elevation.

$d\ d$ are the stays, which rest on frame B, and support seed-box D.

G is the bar, to which the seed-spouts N are attached by means of chains $e$.

The length of the bar G, and the number of seed-spouts may vary as required.

The bar G is pivoted in metal plates $s$, shown in dotted lines, fastened to the inside of the end-pieces of frame B.

$i$ represents the pivots, shown in dotted lines, on which the bar G is suspended; the said pivots consisting of a rod bent at one end inward, so as to enter the said bar, and bent outward at the other end, so as to enter the frame B.

$m$ designates a pulley, working between two metal plates secured to the back of seed-box D.

$n$ is an S-shaped device, placed between the end of the pulley $m$ and the plate to which the said pulley is pivoted, and playing on the same pivot that passes through pulley $m$.

$c$ is a knob or tooth on the back of $n$, the object of which will be hereafter explained.

$h\ h'$ represent two pulleys, working between metal plates on the top of seed-box D.

H represents a bar pivoted to the tongue F.

K is a staple in bar G, and placed midway of said bar.

In the operation of my machine, a cord, $j$, will be fastened to device $c$, then passed over pulley $h'$, and fastened to a staple on bar H.

A strap or cord, $d$, will also be fastened to the staple K, on bar G, then passed under pulley $m$ and over pulley $h$, and the end fastened in a staple near the top of bar H.

When the operator desires to elevate the seed-spouts N, he will push the bar H forward until the staple K is sufficiently elevated to raise the device $n$, and get behind the tooth $c$, where it will be securely held.

When it becomes necessary to let the seed-spouts fall again to their first position, the operator will pull the cord $j$, which will raise the device $n$, release the staple K from the tooth $c$, and the shaft with seed-spouts will fall back to the earth again.

Having thus described our invention,

What we claim, and desire to secure by Letters Patent, is—

1. The device $n$, when constructed as and for the purpose set forth.

2. The bar G, when furnished with staple K, in combination with device $n$, pulleys $m$, $h$, and $h'$, cords $j$ and $d$, and bar H, the whole constructed, arranged, and operating substantially as described.

In testimony that we claim the foregoing as our own, we affix our signature, in presence of two witnesses.

JOSEPHUS EASTERDAY.
J. B. CROWELL.

Witnesses:
WM. H. HILLEARY,
J. DEARDORFF.